United States Patent Office 2,993,058
Patented July 18, 1961

---

2,993,058
METHYL 2,3-EPOXY-4-ETHYL-2-METHYLOCTANOATE
Robert L. Hudson, Midland, Mich., assignor to The Dow Chemical Company, Midland, Mich., a corporation of Delaware
No Drawing. Filed Sept. 21, 1959, Ser. No. 840,995
1 Claim. (Cl. 260—348)

The present invention is directed to the novel compound methyl 2,3-epoxy-4-ethyl-2-methyloctanoate. The compound corresponds to the formula

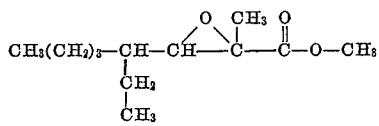

The present compound is a colorless liquid soluble in lower alkanols and in diethyl ether, and of moderate solubility in water. It is useful as a parasiticide, and is adapted to be employed in the control of plant-parasitic nematodes and insects such as cockroaches. It is also useful as a herbicide. The novel compound may be prepared by reacting a mixture of methyl 2-chloropropionate and 2-ethylhexanal with sodium methoxide. Conveniently the reaction may be carried out in an inert liquid reaction medium, such as diethyl ether. Good results are obtained when the reactants are employed in equimolecular proportions. The reaction is strongly exothermic, and takes place smoothly at temperatures from 0° C. to 15° C.

In carrying out the reaction, the sodium methoxide is contacted with 2-ethylhexanal and methyl-2-chloropropionate. The contacting is conveniently carried out by adding the sodium methoxide slowly, portionwise, and with stirring to a solution of the 2-ethylhexanal and methyl 2-chloropropionate in dry diethyl ether, chilled, as on an ice bath, to a temperature near to 0° C. The temperature of the resulting reaction mixture may be controlled by regulating the rate of the addition of the sodium methoxide reactant as well as by external cooling. Upon completion of the reaction, the desired product may be separated in known manners. In one such manner, the reaction mixture is acidfied with dilute acetic acid, extracted with diethyl ether, the ether extract warmed to vaporize and remove solvent, and the resulting residue fractionally distilled under reduced pressure.

The following example illustrates the invention but is not to be considered as limiting it.

*Example*

Sodium methoxide (54 grams; 1.0 mole) was added slowly over a period of time, portionwise, and with stirring to a solution of 2-ethylhexanal (128 grams; 1.0 mole) and methyl 2-chloropropionate (122.5 grams; 1.0 mole) in 300 milliliters of dry diethyl ether in a flask chilled in an ice bath to a temperature in the range of 2°–5° C. The rate of addition was regulated so that the temperature of the resulting reaction mixture did not rise above 10° C. Upon completion of the combining of the reactants, the reaction mixture was stirred for approximately 24 hours as its temperature slowly rose to room temperature. Thereafter, the mixture was acidfied with a large excess of dilute acetic acid. The acetic acid solution was extracted with 750 milliliters of diethyl ether, the ether extract warmed to vaporize and remove ether solvent, leaving a liquid residue. This residue was distilled at slowly rising temperatures and under gradually declining subatmospheric pressure to obtain 166 grams of methyl 2,3-epoxy-4-ethyl-2-methyloctanoate as a colorless liquid residue which boiled at 54° C. under 0.1 millimeter pressure. This product had a refractive index N/D of 1.4378 at 25° C.

The present compound is useful as a herbicide. For such use, the unmodified compound may be employed. In an alternative procedure, the compound may be dispersed upon an inert finely divided solid and the resulting preparation employed as a dust. Also, such preparations may be dispersed in water with or without a wetting agent and the resulting aqueous dispersions used as sprays. In other procedures, the compound may be employed as solvent or as a constituent of solvent-in-water or water-in-solvent emulsions or as aqueous dispersions thereof which may be applied as spray, drench, or wash. In a representative operation, the application to germinant seeds and emerging seedlings of canary grass of an aqueous dispersion containing the present compound in the concentration of 100 parts per million resulted in the kill of a very substantial proportion of the seeds and emerging seedlings. In a similar operation, the application of a similar dispersion to germinant seeds and emergent seedlings of *Brassica rapus* resulted in an almost complete kill.

The present specification and claim are a continuation-in-part of my copending application Serial Number 762,221, filed September 22, 1958, now abandoned.

I claim:
Methyl 2,3-epoxy-4-ethyl-2-methyloctanoate.

References Cited in the file of this patent
UNITED STATES PATENTS
2,889,339   Levy et al. _____ June 2, 1959

FOREIGN PATENTS
588,045   Germany _____ Nov. 16, 1933

OTHER REFERENCES
Uspekhi Khim: vol. 17, pp. 432–451 (1948).
Newman et al.: Organic Reactions, vol. V, pp. 413–440 (pages 414, 418, 420 and 421 relied on) (1949).